United States Patent
Beckman et al.

(10) Patent No.: US 6,780,468 B2
(45) Date of Patent: Aug. 24, 2004

(54) STRING BINDERS

(75) Inventors: Jay Joseph Beckman, Newark, OH (US); Diane Marie Hulett, Glenford, OH (US); William Gerard Hager, Granville, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 10/401,094

(22) Filed: Jun. 11, 2003

(65) Prior Publication Data

US 2004/0033355 A1 Feb. 19, 2004

Related U.S. Application Data

(62) Division of application No. 09/280,808, filed on Mar. 30, 1999, now Pat. No. 6,579,616.

(51) Int. Cl.⁷ .............................................. B05D 3/02
(52) U.S. Cl. .................. 427/314; 427/293; 427/301; 427/324; 427/372.2; 427/442; 428/361; 428/375; 428/401; 428/359; 428/378

(58) Field of Search .................................. 427/293, 301, 427/314, 324, 372.2, 442; 428/361, 375, 401, 359, 378

(56) References Cited

U.S. PATENT DOCUMENTS

| 4,121,009 A | * | 10/1978 | Chakrabarti | ................ 510/520 |
| 5,766,814 A | * | 6/1998 | Baba et al. | ............. 430/111.32 |

\* cited by examiner

*Primary Examiner*—Merrick Dixon
(74) *Attorney, Agent, or Firm*—Inger H. Eckert; Maria C. Gasaway

(57) ABSTRACT

A string binder is disclosed which is useful for making reinforcing articles for use in the manufacture of molded composite articles. The string binder, in one embodiment, comprises a fibrous carrier substrate material covered with a solidified coating comprising a binder resin material having an acid value of less than about 30 mg KOH/g of resin. Additionally, the coating may include a catalyst applied as a separate layer or in combination with the binder resin material. The string binder may be co-roved with one or more ends of a separate fibrous reinforcing material to make a product suitable for use in various molding applications.

6 Claims, 2 Drawing Sheets

STRING BINDERS

This application is a division of allowed application Ser. No. 09/280,808, filed Mar. 30, 1999, now U.S. Pat. No. 6,579,616 the contents of which are incorporated herein by reference.

TECHNICAL FIELD AND INDUSTRIAL APPLICABILITY OF THE INVENTION

The invention relates to a string binder for use in reinforced composite molding applications, and composite articles formed therefrom. Specifically, the novel string binder of the present invention comprises solid strands of a resin composition comprising one or more modified binder resins of low acid value, and, optionally, a fibrous carrier substrate material. The string binder preferably comprises at least one thermoformable resin as the binder resin component, and an effective amount of a catalyst having a high activation temperature. The string binder strands may be combined with one or more fibrous reinforcing materials to form a multi-end roving product, which may be used either in chopped or continuous form as a reinforcement material having improved impact strength. Such reinforcement materials are useful in numerous reinforced composite applications, including the molding of preforms typically used in liquid resin molding of fiber-reinforced articles. The invention further comprises a method of making the novel string binders of the invention.

BACKGROUND OF THE INVENTION

Reinforcing fibers comprising glass, polymer, other reinforcing fibers, or blends thereof are commonly used as reinforcement materials in molded plastic composite articles. These reinforcing materials, when incorporated into the matrix resin of the composites, provide the finished product with a higher level of tensile strength and durability than could possibly be achieved if either the fibers or the resins were used separately. Reinforcing fibers may be incorporated into a composite resin matrix either in continuous form, as is done in the manufacture of filament-wound composites, or the fibers may be introduced into the matrix as chopped segments that may be dispersed throughout the matrix in linear or random fashion, depending on the characteristics that are desired in the final product.

Generally, in the manufacture of reinforcing articles for use in liquid resin molding processes, chopped segments of a fibrous substrate, typically glass strands, may be combined with a binder resin and the resulting composition is laid down over a form and solidified to form a matted structure such as a preform, which can then be cured and/or subjected to further molding processes to form the composite end product.

Several means of combining the binder resin with a glass carrier substrate strand to make preforms are known in the art. For example, an emulsion comprising a heat-curable binder resin may be blended with the glass carrier strand; or the resin and the carrier strand may be combined to form a slurry. The emulsion or the slurry may then be poured onto a form or mold and suction or a vacuum applied to remove the diluent or solvent component, thereby solidifying the preform. The obvious drawbacks associated with using an emulsion binder include the requirement for extensive clean-up of the forming screens; the environmental hazards relating to the discharge of solvent or diluent vapors containing volatile organic chemicals (VOCs); risks to the safety of personnel from exposure to such chemicals; and added costs arising from a lengthy drying period or the need for additional equipment to prepare the preform.

Dry compositions using, for example, a powdered binder in combination with the fibrous carrier material are also known. The powdered binder is heated sufficiently to melt and cure the binder after it is combined with the carrier material. One disadvantage of using the powdered binder is that it may be difficult to control the amount of binder powder required to create an acceptable preform, and the addition of excess resin may foul equipment and require extensive cleanup operations.

To make a preform using molten binder, typically, a glass fibrous carrier substrate is chopped into segments, which are combined with the binder resin and placed over a porous structural form such as a mesh screen. Alternatively, the glass carrier substrate material may be formed into strands that are then chopped into segments and sprayed over the form in combination with a binder. The method of adding the binder may be via a flame-spray process, in which solid, powdered binder resin is sprayed through a flame immediately before it contacts the fibrous carrier material. In this fashion, the binder is melted before it mixes with the fibrous carrier. A process involving the steps of heating, curing and cooling of the material is then applied to form, shape and consolidate the material, as well as to remove any solvents or diluents that may be present, thereby solidifying the product into a preform ready for molding or further processing. The resulting preform may then be removed and used in a subsequent molding operation, such as injection molding, in which a resin is injected around the preform and cured to form a structurally molded composite.

Because these techniques of making the preform typically require applying an excess of binder resin, a commonly observed drawback is the build-up of excess molten binder resin on the equipment, the removal of which is both costly and time-consuming. Moreover, the process includes the inherent difficulties of dealing with the molten binder. The process of adding the binder is difficult to control, and the handling of the molten resin poses an additional safety concern.

Continuous glass fibers that have been pre-impregnated with a binder resin may also be used to form fiber segments for preform manufacture. The impregnated strands, known as string binders, may be formed by applying one or more layers of a binder resin onto the surface of a continuous glass fiber strand after it is formed, then allowing the binder to set on the surface of the strand. After the coating is solidified, the strand is then chopped into coated segments that may be used in the spray-up process to make preforms.

The binders used in preform manufacture are usually either thermoplastic polymers in molten or powdered form, or high acid value thermoset emulsion polymers such as crystalline polyesters. The term "crystalline" relates to the inherent ability of the thermosetting resin to form crystallites or regions of order dispersed among regions of disorder within the solidified polymer. The ability of a polymer to display crystalline properties is determined principally by its composition. For example, thermoplastic polyesters are macromolecules that contain no chemical groups to effect inter-linking. Such materials are typically heated to the softening point, forced into the shape of the desired article, then cooled below the softening point to yield the finished reinforcing article. Like thermosetting polyesters, they may display many levels of crystallinity, again depending on composition. Crystalline polyesters find use in organic fiber manufacture. Perhaps the best known crystalline polyester is polyethylene terephthalate, PET, which is commonly known as DACRON polyester, available from DuPont Inc.

The term "high acid value", as used herein, is intended to represent the acidity of the polymer in terms of the amount of potassium hydroxide (KOH) required to neutralize the acidic functional groups in one gram of the polymer. A high acid polymer is one that contains acidic functional groups such that the measured acid value of the polymer is greater than 30 mg KOH/g of polymer. The known drawbacks of using the above high acid polymers include a high level of incompatibility between the binder resin molecules and the composite matrix resin because of the large degree of difference in polarity between the binder polymer molecules and the matrix resin molecules and/or the absence or unavailability of reactive functional groups that can cross-link with the composite matrix resin. This incompatibility can result in a lesser degree of wet-out of the reinforcing fibers in the composite matrix resin, and associated product defects such as blistering during the composite molding phase, and bleeding or blistering during post-bake of the composite product.

Bleeding is related to certain characteristics of the binder resin that affect compatibility with the matrix composite resin. While thermoplastic and thermosetting resins have been used as a binder resin in string binder formulations, the different characteristics of these types of polymers affect their use in composite formulations. Where the binder resin is a thermosetting polymer, a resin with a lower molecular weight may generally be used because the molecules will link during cure to form a permanently solidified, continuous, cured matrix with essentially infinite molecular weight. The lower molecular weight resin will easily flow and therefore will more fully coat the fibers of the fibrous substrate. Typically, such binder resin polymers are thermosetting crystalline polyester resins made up of small molecules, which melt and flow easily. In contrast, molecules of thermoplastic resin do not link to form a permanently solidified matrix. Rather, the solidified matrix may be induced to re-melt and flow by applying heat. In order to achieve acceptable performance using a thermoplastic resin, it is typically necessary to begin with resins that have a higher molecular weight. Such compounds are usually composed of long chains of atoms, which become easily entangled, thereby causing a restriction of flow. This reduced flow, which results in a higher melt viscosity, is a disadvantage in that it impedes flow of the coating over the fibers. Further, the large, unlinked thermoplastic molecules demonstrate a tendency to diffuse through the composite matrix during post-baking. This diffusion or bleeding typically causes blemishes in the surface of the composite.

Blistering may result from an undesirable chemical reaction between a component of the composite matrix resin and the binder resin during the composite curing process. For example, where the composite matrix resin is a polyurethane, an isocyanate group of the polyurethane may react with acid or water in the binder to form carbon dioxide and an amine as reaction by-products. The evolution of the carbon dioxide gas can lead to the formation of blisters on the surface of the cured composite. Blistering may ultimately result in decreased glass/matrix resin bond strength in the preform-reinforced composite, and, as a result, the physical strength of the finished molded article may be diminished. Blistering is also aesthetically undesirable because the appearance of the finished product is compromised.

There is, therefore, a need for a fibrous carrier substrate material that is efficiently combined with a binder resin before the preform is molded, such that the separate application of a liquid binder in the form of a powder melt, emulsion or slurry is not required. Further, there exists a need for a fibrous reinforcement material in combination with a binder resin that enhances wet-out, and prevents undesirable effects such as blistering or bleeding when the binder-coated fibers are used during the composite formation process. There also exists a need for a preform composition material that does not rely on the use of organic solvents that are environmentally hazardous, or other solvents that require a drying procedure that lengthens the manufacturing process. These needs are met by the invention described herein.

SUMMARY OF THE INVENTION

This invention relates to a string binder comprising polymerized filaments of a thermoformable resin material having a low acid value, preferably less than about 30 mg KOH/g of resin. The string binder may further comprise a fibrous carrier substrate material coated with a composition comprising a thermoformable binder resin material, said composition imparting thermoformability to the fibrous carrier material used in reinforcing articles made using the string binder. The string binder of the present invention may optionally be co-roved with one or more strands of at least one other reinforcing material to form a multi-end roving for use in manufacturing reinforcing articles such as preforms, which may be used in an injection molding process. Further, the string binder and the co-roved product containing it may be formulated without the use of a liquid emulsion binder. Instead, an effective amount of a binder resin coating composition may be applied to the surface of the carrier substrate material and solidified to form a ready-to-use product comprising the binder resin and the fibrous carrier material. The invention further relates to a composition for forming a reinforcing article comprising a thermoformable binder resin having a low acid value.

As used herein, the term "thermoformable" is intended to mean a resin that can be formed by heating, such as a thermoplastic, or a resin that is irreversibly set using heat, such as a thermosetting resin. The binder resin comprises a polymer that is specially modified to have a low acid value, preferably in the range of less than about 30 mg KOH/g resin, and most preferably less than 10 mg KOH/g resin. The term "fibrous carrier material" is defined to mean a fibrous substrate selected from reinforcing materials that are commonly known in the art. The "binder resin material" is a polymer that is used to fuse the fibers or strands of the fibrous carrier material such that the mixture of fibrous carrier and the binder resin may be solidified and cured to form a reinforcing article such as a preform, which may be used in a further manufacturing process to make a composite article. Where the reinforcing article is a preform, it may typically comprise from about 10% to about 15% by weight of string binder, with from about 85% to about 90% by weight of another reinforcing material. The ratio of the amount of fibrous carrier material to the amount of binder resin material is preferably about 50:50 in the string binder.

The string binder of the present invention preferably combines the fibrous carrier substrate material with the binder resin composition to form a solid product that may be used in continuous or chopped form as a raw material in the preparation of preforms for molding processes. In such an embodiment, the product comprises a binder resin coating material solidified on at least a portion of the fibrous carrier material of the string binder. Additionally, other embodiments of this product may include, for example, a string binder comprising the novel binder resin material of this invention in the absence of a carrier substrate. Further, the string binder of either of the previously described embodiments may be combined with a reinforcing material in addition to that used as the fibrous carrier, in an amount sufficient to form a reinforcing article. As used herein, the term "fibrous reinforcing material" is a material generally known in the art for providing reinforcement, which is used in addition to the fibrous carrier substrate material. This material is preferably in the form of a continuous roving having linearly aligned filaments.

Compared to the conventional approach of applying a liquid binder to strand segments during preform manufacture, there are several known advantages to using the various embodiments of the string binder of the present invention. For example, where the string binder is desirably used to make a reinforcing article, use of the string binder as a reinforcement is greatly simplified because the need to apply a liquid binder resin on the preform screen is eliminated. Specifically, the problems of poor binder resin application efficiency and excess build-up of resin on equipment, which has been a concern of preform makers using more conventional approaches, is altogether eliminated. Additionally, because no solvents are used to dissolve or emulsify the binder resin, emissions of volatile organic chemicals from the solvent during the forming operation are substantially eliminated, and the associated risks to worker safety are removed. Use of the string binder product of the invention also results in products having superior physical characteristics and appearance.

In accordance with yet another aspect of this invention, the string binder may comprise a core strand of a fibrous carrier substrate, and a binder resin coating further comprising a catalyst. The catalyst may be applied as a separate layer in addition to the binder-comprising coating of this invention, or, alternatively, it may be incorporated into the binder resin coating composition before it is applied to the surface of the reinforcing fibers. The role of the catalyst is to effect cure of the binder resin during the manufacture of the reinforcing article. Accordingly, the catalyst must be a compound or mixture of compounds that is compatible with the binder resin and which has a temperature of activation that is higher than the processing temperature used to melt the string binder as it is being formed into the reinforcing article. For example, where the reinforcing article is a preform, the catalyst should have an activation temperature that is higher than the temperature required to melt the binder resin as the string binder is formed into the preform. In this manner, the binder resin polymer may, for example, be used to coat the fibrous carrier material, or it may be formed alone as a string binder, without initiating the curing process. Rather, the activation temperature of the catalyst is such that catalytic activity is initiated during the step of curing of the preform.

Still another aspect of the invention includes a method for making a string binder, comprising the steps of:

a) forming a strand of a fibrous carrier substrate;

b) preparing a solvent-free binder coating composition comprising a thermoformable liquid binder resin material having an acid value of less than about 30 mg KOH/g of resin;

c) applying the binder coating composition to the surface of the fibrous carrier substrate material and allowing it to set into a solid coating, thereby forming a string binder; and d) optionally chopping the string binder into segments.

The string binder may optionally be co-roved with one or more strands of a fibrous reinforcing material to form a multi-end roving which may be used, in continuous or chopped form, in various reinforcing applications. Additionally, the string binder may be incorporated into a woven or stitched fabric reinforcement, such as a woven roving or a multi-axial stitched reinforcement.

The inventive concept herein disclosed also includes a preform manufactured using a chopped segments of a thermosettable string binder as is herein described, or chopped segments of a multi-end roving comprising one or more strands of the string binder in combination with one or more strands of a fibrous reinforcing material. The chopped segments may be laid up on a consolidation screen, and optionally compressed using suction drawn through the screen to form the material into a desired shape that conforms to the contour of the screen. Preferably, the binder resin in the preform is fully cured before the preform is molded to form the composite product.

In yet another embodiment, the invention provides a reinforced, molded article formed by molding a moldable material comprising a matrix polymer such as a thermoplastic or thermoset polymer, in contact with a preform comprising the string binder which is herein described.

These and other attributes of the invention will be clear to those skilled in the art in light of the following description and drawings.

DETAILED DESCRIPTION OF THE INVENTION

Figure 1:
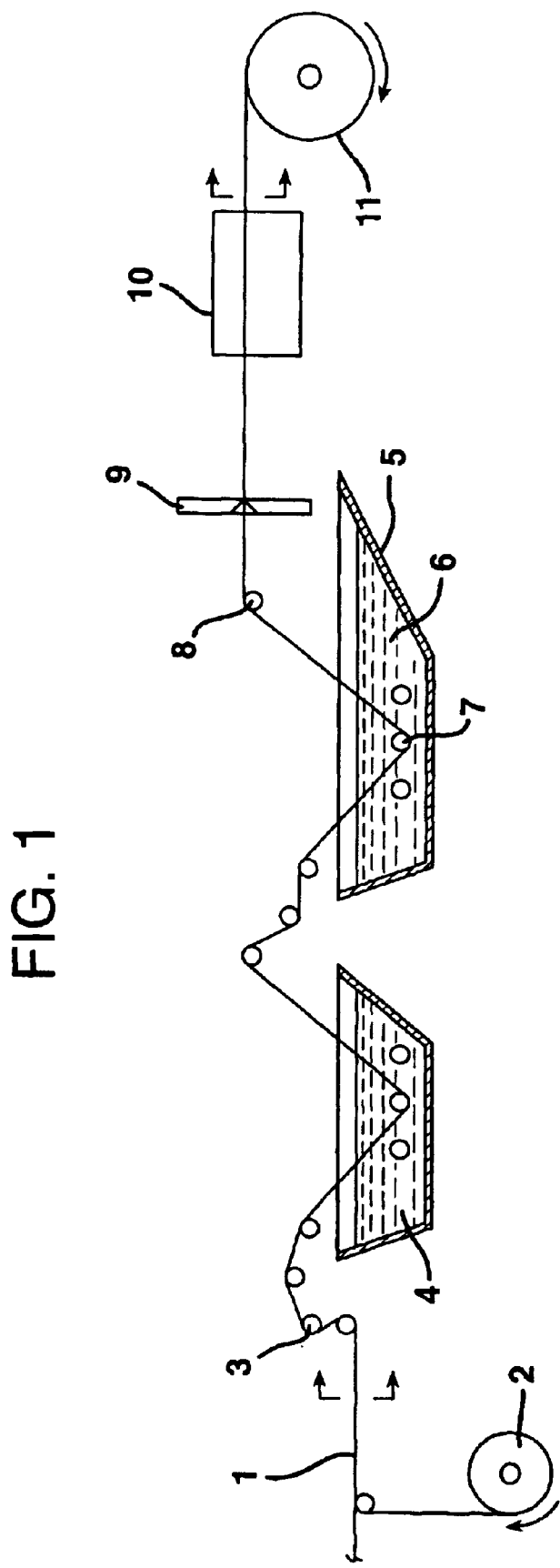
FIG. 1 is a schematic diagram of a preferred binder resin coating operation used to make the string binder.

The string binders of the present invention integrally comprise a fibrous carrier material as a substrate, and a composition comprising a thermoformable binder resin deposited onto the surface of the fibrous carrier material to form a coating. Preferably, the fibrous carrier material may be selected from fibrous materials that are commonly known in the art, such as glass, carbon, natural fibers, polymers and other fiberizable materials known in the art, or mixtures thereof. Examples of fibrous carrier materials that can be used either alone or in combination with glass or carbon fibers include thermoplastics, polyaramids such as KEVLAR® and natural fibers. The fibrous carrier material is preferably a fibrous material in the form of continuous strands composed of multiple filaments. The strands may take the form of yarns, or rovings, including two-end and four-end rovings. Preferably, the strands of fibrous carrier material comprise reinforcing fibers. Typically, such reinforcing strands are formed by combining filaments of the reinforcing fiber material as they are attenuated from a fiber-forming apparatus such as a bushing or orifice plate, although they may also be made by any method conventionally known in the art. The filaments may be coated with a sizing composition comprising functional agents such as lubricants, coupling agents and film-forming polymers, after which they are gathered into strands. These strands may then be formed into yarns or rovings.

Preferably, the diameter of the filaments making up the reinforcing strands ranges from about 3.5 to about 24 μm, preferably from about 9 to about 13 μm. The preferred filament diameters correspond to U.S. filament designations H, G. and K, with K fibers having the largest diameter. The preferred strand input has a yield of from about 3,700 to about 7,500 yd/lb, most preferably about 7,500 yd/lb, or approximately 66 TEX (g/km measurement reflecting the weight and thickness of the strand).

The binder resin material that is preferably used in the practice of this invention is a crystalline resin that has been modified to have an acid value of less than about 30 mg KOH/g resin. Preferably, the acid value is less than about 10 mg KOH/g resin. It has surprisingly been discovered that a lower acid value is effective to increase compatibility with particular composite matrix polymers, whereas the common practice in the art has been to maximize the acid value to make the binder resin emulsifiable in water. In this respect, the binder resins of the present invention differ from the resin materials previously known in the art, in that typical art-recognized acid values for binder resins are on the order of about 30 mg KOH/g resin or higher.

The lower acid value that is favored for the present string binders is achieved by modifying the end groups of the binder resin polymer to be more compatible with the composite matrix-forming resin, which is preferably but not limited to a urethane. As a result of this improved compatibility, the binder resin material is able to achieve better integration with the composite molding polymer, and the resulting products show reduced blistering upon cure.

The preferred binder resins that may be used in the practice of this invention include one or more acid-modified thermoplastic or thermosetting resins, such as a crystalline polyester resin. Preferably, the low-acid crystalline polymers are manufactured by controlling the proportions of ingredients and processing conditions during polymerization. The resulting modified resin comprises particular desirable molar proportions of the monomers that are condensed to form the polymer. The modified resin is then transferred to either a fiber drum or release paper and cooled to room temperature, after which the crystalline mass may be broken into small pieces and ground into a coarse powder. Exemplary combinations of polymers that may be formed by a combination of different monomers is set forth below:

| Monomers | Molar Ratios |
| --- | --- |
| ethylene glycol/fumaric acid | 1.0/1.0 |
| 1,6-hexanediol/fumaric acid | 1.02/1.0 |
| 1,6-hexanediol/ethylene glycol/fumaric acid | 0.82/0.2/1.0 |
| 1,6-hexanediol/ethylene glycol/fumaric acid | 0.92/0.1/1.0 |
| 1,6-hexanediol/1,4-butanediol/fumaric acid | 0.82/0.2/1.0 |
| 1,6-hexanediol/1,4-butanediol/fumaric acid | 0.92/0.1/1.0 |
| 1,6-hexanediol/1,4-cyclohexanedimethanol/fumaric acid | 0.92/0.1/1.0 |
| 1,6-hexanediol/1,4-cyclohexanedimethanol/fumaric acid | 0.82/0.2/1.0 |
| 1,4-butanediol/fumaric acid | 1.03/1.0 |
| 1,4-butanediol/ethylene glycol/fumaric acid | 0.82/0.2/1.0 |
| 1,4-butanediol/ethylene glycol/fumaric acid | 0.70/0.3/1.0 |
| 1,4-butanediol/ethylene glycol/fumaric acid | 0.92/0.1/1.0 |
| 1,4-butanediol/1,6-hexanediol/fumaric acid | 0.82/0.2/1.0 |
| 1,4-butanediol/1,6-hexanediol/fumaric acid | 0.92/0.1/1.0 |
| 1,4-cyclohexanedimethanol/ethylene glycol/fumaric acid | 0.93/0.1/1.0 |
| 1,4-cyclohexanedimethanol/ethylene glycol/fumaric acid | 0.83/0.2/1.0 |
| 1,4-cyclohexanedimethanol/1,6-hexanediol/fumaric acid | 0.83/0.2/1.0 |
| 1,4-cyclohexanedimethanol/1,6-hexanediol/fumaric acid | 0.90/0.1/1.0 |
| 1,4-cyclohexanedimethanol/1,4-butanediol/fumaric acid | 0.83/0.2/1.0 |
| 1,4-cyclohexanedimethanol/1,4-butanediol/fumaric acid | 0.90/0.1/1.0 |

The combination of monomers as described can also be used to affect the melting point of the resulting polymer. For example, the melting points of polymers formed using the combinations described above can have melting points ranging from less than about 100° C. to over 160° C.

In a particularly preferred embodiment, the crystalline polyester binder resin is used in conjunction with a catalyst having a high activation temperature which is higher than the melting point of the crystalline polymer. Preferably, the activation temperature of the catalyst is in the range of from about 350 ° F. to about 400° F. The catalyst is preferably applied as a separate coating layer, but may also be blended into the coating composition containing the binder resin, provided that the relatively lower temperature and other conditions selected for manufacturing the string binder are such that the catalyst is not prematurely activated. Preferably, the catalyst is activated at the higher temperatures used in preform manufacture. When activated, the catalyst promotes the formation of a cross-linked product. Exemplary families of catalysts that may be used with the invention include: diacyl peroxides, for example benzoyl peroxide; peroxyesters, for examplet-butyl-peroxy-2-ethylhexanoate; dialkyl peroxides such as dicumyl peroxide; hydroperoxides such as cumene hydroperoxide; perketals such as 1,1-di-(t-butyl-peroxy)cyclohexane; and peroxydicarbonates such as di(2-ethylhexyl)peroxydicarbonate. Preferred catalysts include t-butyl perbenzoate and dicumyl peroxide. One or more of these catalysts may be prepared as a dilute dispersion comprising about 5 parts catalyst to about 95 parts of a solvent such as acetone. Alternatively, a formulation comprising about 1 part catalyst to about 99 parts solvent may be used. The catalyst may be applied as a separate coat under, above, or interspersed between coats of the binder resin composition.

FIG. 1 shows a preferred process for the making of one embodiment of the thermosettable string binder of this invention. In FIG. 1, a fibrous carrier strand input 1, which is preferably an E-glass strand, is fed from a feed spool 2 through an optional tensioner bar arrangement 3. Where a catalyst is used, the strand may be passed through a first bath 4 containing a solution or dispersion of a suitable catalyst, before being introduced to the binder-resin coating bath 5. Preferably, if the catalyst is applied from a solution, the solvent may be evaporated from the surface of the strand by any conventional means before it is coated with the binder resin. The catalyst-coated strand is then passed into an immersion coating bath 5 containing the coating composition 6. The coating bath may be any conventional immersion coating apparatus suitable for immersing continuous fiber substrates of indefinite length. Preferably, the bath is heated so that the binder resin to be coated onto the glass fiber is in a molten or liquid state to adequately wet the fiber. The temperature of the bath is selected based on the softening or melting properties of the resin, in that the temperature should be high enough to melt the resin and keep it in a molten state, while at the same time being low enough to avoid initiating a premature cure.

The bath 5 is preferably equipped with conventional breaker bars 7 to guide the strand while it is submerged in the bath. After exiting the bath, the strand may be passed over at least one additional breaker 8 before being fed through a stripper die 9 to remove substantially all but the desired amount of resin from the strand. The stripper die is selected to have an orifice opening of the appropriate diameter to meter the desired amount of resin onto the fibrous glass structure. For example, the stripper die orifice may be of a diameter ranging from about 0.010–0.025 inches across, for example about 0.020 in. Preferably, the stripper die is gauged to produce a coated strand with a binder:carrier ratio of from about 20% to about 60% of binder resin in relation to the weight of the entire strand.

The coating process may be modified to include applying more than one layer of the binder resin or catalyst coating compositions, and if desired, cooling. The strand having the desired amount of resin may then be passed through an air chamber 10, where the coating sets and solidifies. The air chamber is any suitable enclosure for allowing the binder resin to re-solidify or re-crystallize to a solid state. Preferably, unheated forced air is applied in order to speed the solidification or crystallization process without effecting premature curing of the resin.

In a preferred embodiment, the catalyst pre-coat may be applied to the fiber strand input in any convenient manner using conventional coating equipment. Such techniques include, for example, spraying, roller or pad coating, wire coating or immersion. Preferably, the strand is immersed in a bath containing the catalyst coating solution or dispersion. The amount of coating applied can be determined by evaluating the loss on ignition (LOI) of the coated glass fiber.

It is also possible to apply the catalyst and resin to a strand in a single coating step, if the catalyst and resin are selected such that they can be mixed without prematurely initiating cure of the resin during preform manufacture. Accordingly, in another embodiment, the crystalline polyester binder resin and the catalyst may be combined and the composition applied to the fibrous substrate at a temperature below the activation temperature of the catalyst. Such a one-step process advantageously allows certain equipment and processing steps to be eliminated, and provides for a more cost-efficient manufacture of the string binder. For example, the binder resin composition may be combined in a static mixer or one-step injection die system, such that the catalyst is added to the binder resin composition immediately before it is coated onto the surface of the fibrous carrier substrate. In such an embodiment, a solution of the catalyst may not be necessary, and thus this source of waste solvent may be eliminated from the system.

In such instances, the molten binder resin is prepared by heating powdered binder in a hot-melt processor. The processor is linked, by a direct input feed to a static mixer, thereby allowing the flow of the resin composition through an outlet disposed in the processor, and through the inlet port of an impregnation or coating-type die. A pump or other conventional flow regulation device controls the feed from the outlet port of the static mixer to the inlet port of the die. The die also comprises an aperture for input of a carrier fiber strand. The direction of movement of the strand input through the die is preferably aligned transverse to the flow of binder resin composition from the static mixer. The strand is then coated by the catalyst/resin mixture at a temperature below the activation temperature of the catalyst. The selection of the appropriate catalyst and resin system will depend on compatibility of the catalyst and resin, as well as the relative resin melting point and catalyst activation temperature. Coating equipment useful to carry out this variation of the invention is similar to that shown in FIG. 1, except that the coating bath includes the catalyst/resin mixture.

The dried coated strand, as it exits the cooling chamber, is optionally passed over a series of one or more breaker bars (not shown) and then wound onto a product spool or collet 11 using any conventional winding apparatus for storage. The rate at which the fiber is wound depends on the drying conditions, the composition of the resin, the amount of resin remaining on the strand once the excess has been removed, and other factors affecting the drying rate that are known to those skilled in the art. In short, the winding rate is preferably the maximum rate possible that allows the resin to solidify or re-crystallize on the fiber strand before it is spooled, and is readily obvious to the person skilled in the art. Rates on the order of 80–200 ft/min have been achieved.

In another preferred embodiment of the invention, the string binder formed according to the above-described process may be co-roved with another reinforcing fiber material to form a multi-end roving having the desirable characteristics of the novel string binder. In such an embodiment, one or more strands of the string binder is roved together with one or more strands of a standard fibrous reinforcing material, such as glass, using any conventional winding process. For example, roving ends from 1–3 wound spools of continuously formed string binder of the present invention may be lined up in a creel simultaneously with roving ends from about 10–20 forming cakes of glass reinforcing fiber strand. Unlike the string binder of the present invention, the glass reinforcing fiber strand used to make the co-roved product is not treated with the low acid polymer formulation used to form the string binder. The reinforcing fiber strand may, however, be sized with an acceptable sizing treatment before being co-roved with the string binder. Application of a sizing treatment typically provides certain desirable effects to the roving, such as protection from damage by attrition or erosion, and enhances wetout of the fibers in the composite matrix, when molded. Preferably, the sizing treatment is applied to the strands before they are wound into forming cakes.

The ends may then be wound together onto a spool, thereby forming a multi-end roving having a proportionate amount of string binder within the roving. The proportion of string binder to reinforcing strand material may be varied according to the desired product specifications, the quantities of each being readily determined by one having ordinary skill in the art. Preferably, the proportion of string binder to fiber reinforcing material in the present invention ranges from about 10 to 15% by weight of string binder to about 85% to 90% by weight of fiber reinforcing material.

The co-roved, multi-end product formed according to the method of this invention embodiment may be incorporated into several reinforcing articles, depending on the desired application. For example, rovings may be used to form a woven fabric reinforcement, such as a woven roving or a multi-axial stitched reinforcement. Alternatively, the multi-end rovings may also be used, in continuous or chopped form, in various applications requiring an input of reinforcing fiber segments.

In an embodiment requiring input of chopped segments of a reinforcing strand, instead of being spooled after forming, the solidified strand of string binder, or, preferably, the co-roved multi-end product comprising the thermosettable resin-coated string binder, may immediately be chopped into segments. Preferably, the length of such segments is typically from about ½ inch up to about 3 inches in length. Most preferably, the chopped segments are from about 1 inch to about 3 inches in length.

The segments obtained according to the aforementioned procedure are preferably used to make preforms using a spray-up process. In a particularly preferred embodiment including this method, segments of a multi-end roving comprising the string binder are blown or spread by conventional means over a shaped preform screen and a sufficient level of heat applied to soften the binder resin enough to permit some fusing of the segments. Preferably, suction is applied to promote compacting of the segments as they fuse. The process of fusing allows the layered material to conform to the shape of the preform screen, and the material is then set into a solid matted structure or preform that can be physically transported if necessary to another location to complete the molding process that forms the final composite product. Preferably, the preform may be subjected to heat, radiation or other curing means to cure the preform before it is molded.

Figure 2:
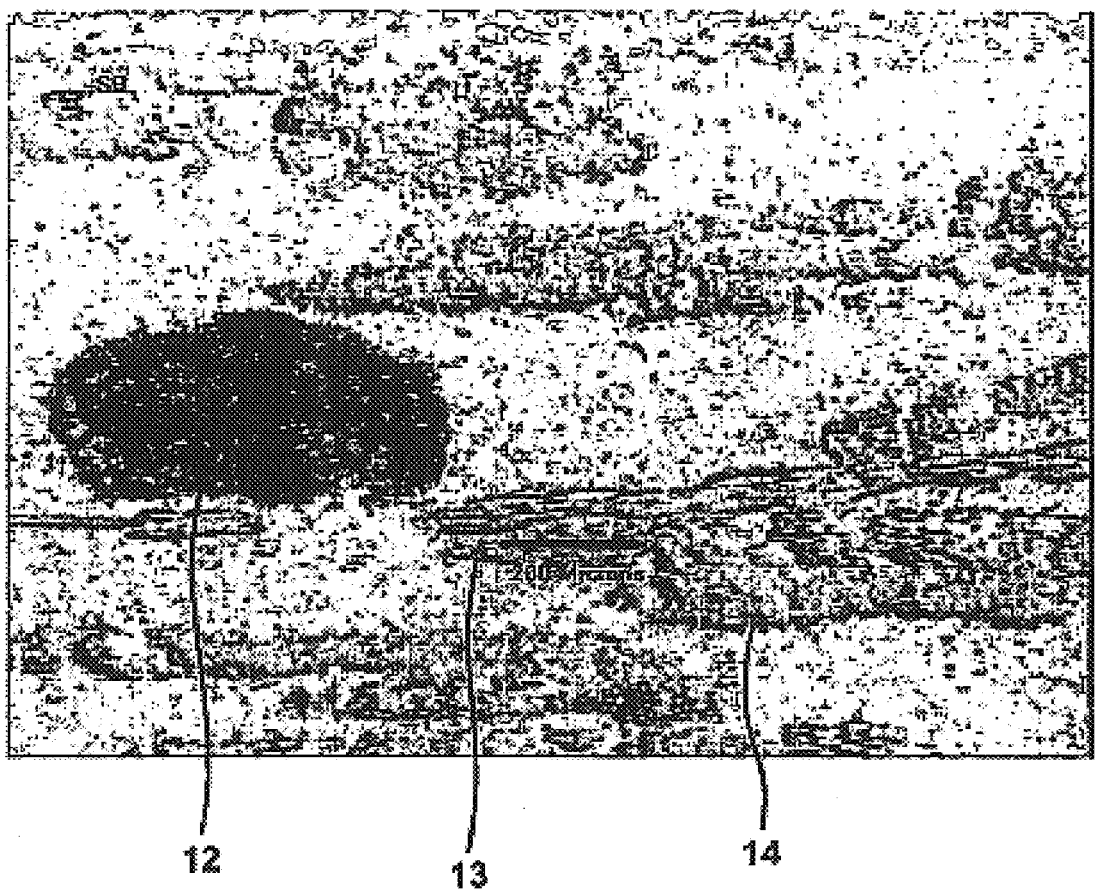
FIG. 2 is a photomicrograph of a cross-section of a composite laminate incorporating the string binder of the present invention. The laminate shows good wet-out of the fiber reinforcement tows in the matrix resin.

The preform of this invention may be used in otherwise conventional molding processes, for example liquid resin molding. Typically, the preform is placed in a mold cavity into which a moldable material is injected or otherwise added. Any moldable materials which are compatible with the thermoset binder material of the preform can be used as the matrix resin system of the composites. Typical matrix resin systems that can be used include vinyl esters, polyesters, urethanes and phenolic thermoplastics. Preferably, the matrix resin is a urethane polymer that is compatible with the low-acid-value binder resin of this invention. The skilled artisan will be able to identify other moldable materials suitable for use with preforms made according to this invention without undue experimentation. A transverse section of a molded preform according to the present invention is represented by FIG. 2, which depicts the string binder 12, embedded in a matrix resin 13, which also comprises fibrous reinforcement tows 14.

The string binder of the present invention therefore comprises, in its various embodiments, a core strand of fibrous carrier material, which is coated on its surface with at least one layer of a binder resin coating material, and it may also comprise at least one separate layer of a catalyst coating material. Further, the catalyst may be commingled with the binder resin in the coating, or the fiber may include strands having a catalyst coating as well as strands not treated with a catalyst. Similarly, with respect to the binder resin coating, one or more strands of the string binder comprising such a coating may be formed into multi-end rovings with one or more strands of a fibrous reinforcing material, thereby modifying the amount of binder resin material in the final co-roved product. In addition to forming a continuous, roved product, the string binder or co-roved product formed therefrom may also be chopped into segments and used in forming operations such as the manufacture of durable preforms.

The following examples are representative of the invention.

EXAMPLES

Example 1

Preparation of Low-Acid Crystalline Resin

A 50 gallon stainless steel reactor configured with a steam-heated packed column and a water-cooled condenser was loaded with 95.57282 kg of fumaric acid, 74.20541 kg of 1,4-butandeiol and 10.222177 kg of ethylene glycol. To this mixture was added 16.74 g of hydroquinone as a polymerization inhibitor. The reactor was heated to about 200° C. and sparged with nitrogen gas, thereby facilitating the poly-condensation reaction, which produced water of condensation as a by-product. Throughout the reaction, the acid value was measured using a standard titration against an aqueous potassium hydroxide (KOH) solution, to derive the degree of acidity expressed as the milligrams-of KOH needed for neutralization per gram of resin.

When the acid value had been reduced to a value from 0 to 30 mg KOH/g resin, the reaction mass was cooled to a temperature of from about 120° C. to about 150° C., at which time 82.44 g of t-butylcatechol and 2.70 g p-benzoquinone was added to the molten mass. (At this point, other compounds may optionally be added, such as from about 1% to about 5% weight of oligo(propylene glycol-alt-maleic anhydride); about 0.25% weight dipropylene glycol and about 1% weight styrene. The resin was then transferred to a fiber drum or release paper over a 15–30 minute period, and allowed to cool to room temperature. The solidified crystalline resin was then broken into small pieces and ground into a powder. The final acid value of the crystalline material ranged from about 0 to about 15 mg KOH/g resin.

Example 2

Preparation of String Binders

A one end strand of G-75 glass yarn (7500 yd/lb.) was coated with a solution of 1.5 parts catalyst in 98.5 parts acetone, and allowed to dry. The dry catalyst coated strand was then passed through a heated bath of low-acid crystalline polyester maintained at a temperature of about 133° C. The crystalline polymer as prepared according to the scheme described in Example 1 above. The resin-impregnated strand was then pulled through a stripper die with an opening diameter of about 0.012 in. to remove the excess resin. The resin was then solidified on the strand as it was pulled through an unheated, forced-air cooling chamber at a rate of about 80 ft./min. At a location about 10 feet from the exit of the die, and before the entrance of the cooling chamber, the strand was exposed to a fine mist water spray to facilitate cooling.

The resulting strand was then cut into small pieces of about 3" in length, and put into an oven at 390° F. for 4 min. This step served as a quality check to ensure that the binder resin would properly melt and cure during matrix resin impregnation and cure of the composite. At the end of the 4-min. period, the sample was removed from the oven. At that point, the sample was hard and stiff, and a definite color change from white to a clear yellow was observed, indicating a good cure. The LOI (loss on ignition) of the sample was determined to be about 50.3%. This value indicated that approximately 50.3% of the strand weight was organic, non-glass material.

When the string binder of the present invention was fabricated into preforms and molded with a matrix resin system to form composites, several improvements were observed in comparison to composites made using preforms with the fiber-binder systems of the prior art. The invention provided composites in which the fiber strand segments were less visible, which was an indication of better wet-out in the composite matrix resin. Further, there was a visible reduction in the degree of blistering that occurred when the composite was finally molded and cured. There was also a reduction in the degree of bleeding after a post-bake process.

The use of the string binders of the present invention demonstrates certain manufacturing improvements over the prior art. By using the string binders herein described, preforms may be manufactured without the need for metering, measuring or otherwise controlling the addition of a separate molten or solubilized binder during the preform manufacturing process. The string binder may also be used without requiring the re-tooling of existing manufacturing equipment. Further, the binder is more efficient because its use eliminates the problem of excess binder resin residues on the forming equipment, and consequently makes cleanup more efficient.

It is believed that Applicants' invention includes many other embodiments which are not herein described, accordingly this disclosure should not be read as being limited to the foregoing examples or preferred embodiments.

What is claimed is:

1. A process for making a string binder comprising the steps of:
   a) preparing a composition comprising a binder resin having an add value of less than about 30 mg KOH/g resin;
   b) applying the composition to the surface of a fibrous carrier material; and
   c) solidifying the composition on the surface of the fibrous carrier substrate material to form a string binder.

2. The process of claim 1, comprising the additional step of applying a catalyst to the surface of The fibrous carrier substrate material.

3. The process of claim 2, wherein the catalyst is mixed with the composition comprising the binder resin before it is applied to the surface of the fibrous carrier substrate material.

4. The process of claim 2, wherein the catalyst is applied in a separate coating step before applying the composition comprising the binder resin to the surface of the fibrous carrier material.

5. The process of claim 1, further comprising the step of chopping the string binder into segments of from about ½" to about 3" in length.

6. The string binder formed by the process of claim 1.

* * * * *